US012693880B2

(12) United States Patent
K N et al.

(10) Patent No.: US 12,693,880 B2
(45) Date of Patent: Jul. 28, 2026

(54) PLURALITY OF SMART NETWORK INTERFACE CARDS ON A SINGLE COMPUTE NODE

(71) Applicant: Juniper Networks, Inc., Sunnyvale, CA (US)

(72) Inventors: Kiran K N, Bangalore (IN); Yuvaraja Mariappan, San Jose, CA (US); Vinod Nair, San Jose, CA (US); Shailender Sharma, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 576 days.

(21) Appl. No.: 17/644,497

(22) Filed: Dec. 15, 2021

(65) Prior Publication Data

US 2022/0334864 A1 Oct. 20, 2022

(30) Foreign Application Priority Data

Apr. 14, 2021 (IN) .............................. 202141017402

(51) Int. Cl.
*G06F 9/455* (2018.01)

(52) U.S. Cl.
CPC ...... *G06F 9/45558* (2013.01); *G06F 9/45545* (2013.01); *G06F 2009/4557* (2013.01); (Continued)

(58) Field of Classification Search
CPC ............. G06F 9/45558; G06F 9/45545; G06F 2009/4557; G06F 2009/45583; (Continued)

(56) References Cited

U.S. PATENT DOCUMENTS 7,185,106 B1 * 2/2007 Moberg .............. H04L 12/4675
709/245
9,571,394 B1 2/2017 Sivaramakrishnan et al.
(Continued)

FOREIGN PATENT DOCUMENTS

CN 107948072 A 4/2018
CN 108540381 A 9/2018
(Continued)

OTHER PUBLICATIONS

Chen et al. CN112052068A Description Translation, Dec. 8, 2020, <https://worldwide.espacenet.com/publicationDetails/description?CC=CN&NR=112052068A&KC=A&FT=D&ND=3&date=20201208&DB=&locale=en_EP>, pp. 1-14 (Year: 2020).*
(Continued)

*Primary Examiner* — Hsing Chun Lin
(74) *Attorney, Agent, or Firm* — Shumaker & Sieffert P.A.

(57) ABSTRACT

Example techniques and computing devices are disclosed. An example computing device includes a first non-uniform memory access (NUMA) node and a second NUMA nod. The first NUMA node includes a first network interface card, a first virtual router for one or more virtual networks, the first virtual router comprising first processing circuitry and configured with a first virtual host interface having a first Internet Protocol (IP) address, and a first workload executing on the first NUMA node. The second NUMA node includes a second network interface card, a second virtual router for the one or more virtual networks, the second virtual router comprising second processing circuitry and configured with a second virtual host interface having a second IP address, and a second workload executing on the second NUMA node.

18 Claims, 6 Drawing Sheets

(52) U.S. Cl.
 CPC .............. *G06F 2009/45583* (2013.01); *G06F 2009/45595* (2013.01)

(58) Field of Classification Search
 CPC ............. G06F 2009/45595; G06F 8/61; H04L 49/254; H04L 49/70
 See application file for complete search history.

(56) References Cited

U.S. PATENT DOCUMENTS

| | | | | |
|---|---|---|---|---|
| 10,567,275 | B2 | 2/2020 | Babu et al. | |
| 10,728,145 | B2 | 7/2020 | Rao et al. | |
| 2010/0217949 | A1* | 8/2010 | Schopp | G06F 9/5077 711/E12.002 |
| 2016/0057066 | A1* | 2/2016 | Gasparakis | G06F 9/48 709/226 |
| 2017/0289036 | A1* | 10/2017 | Vasudevan | H04L 49/70 |
| 2019/0297013 | A1 | 9/2019 | Xin et al. | |
| 2019/0332408 | A1 | 10/2019 | Jiang et al. | |
| 2019/0394081 | A1* | 12/2019 | Tahhan | H04L 41/122 |
| 2020/0036577 | A1* | 1/2020 | Bhagvath | H04L 63/0272 |
| 2020/0059459 | A1* | 2/2020 | Abraham | H04L 12/4641 |
| 2020/0073692 | A1* | 3/2020 | Rao | H04L 12/4633 |
| 2020/0244577 | A1* | 7/2020 | Gasparakis | H04L 45/74 |
| 2020/0358660 | A1* | 11/2020 | Vecera | H04L 43/20 |
| 2020/0379907 | A1* | 12/2020 | Rostykus | G06F 9/505 |
| 2021/0149703 | A1* | 5/2021 | Patle | G06F 16/188 |
| 2022/0014465 | A1* | 1/2022 | Wang | H04L 12/4662 |
| 2022/0191139 | A1* | 6/2022 | Dutta | H04L 69/22 |

FOREIGN PATENT DOCUMENTS

| | | | | |
|---|---|---|---|---|
| CN | 110875844 | B | 3/2020 | |
| CN | 112052068 | A * | 12/2020 | .......... G06F 9/45558 |
| WO | 2013/184846 | A1 | 12/2013 | |

OTHER PUBLICATIONS

Mackie et al., "BGP-Signaled End-System IP/VPNs," draft-ietf-13vpn-end-system-06, Dec. 15, 2016, 31 pp.

"Opencontrail-blueprints / Hardware-Acceleration-Blueprint.md" GitHub, Nov. 30, 2016, retrieved from https://github.com/Netronome/opencontrail-blueprints/blob/master/Hardware-Acceleration-Blueprint.md, 14 pp.

K N et al. "Day One:Contrail DPDK vRouter: Inside the software-defined, high-performance, feature rich, open source Tungsten Fabric virtual router." Juniper Networks, Inc., Jan. 7, 2021, 196 pp.

Song et al. "Day One: Building Containers with Kubernetes and Contrail," Juniper Networks, Inc., Nov. 13, 2019, 283 pp.

Extended Search Report from counterpart European Application No. 22165140.9 dated Aug. 18, 2022, 25 pp.

Sun et al., "Considerations for Benchmarking Network Performance in Containerized Infrastructure", draft-dcn-bmwg-containerized-infra-00, Mar. 2020, pp. 1-21.

First Office Action and Search Report, and translation thereof, from counterpart Chinese Application No. 202210382226.7 dated Aug. 7, 2023, 10 pp.

Response to Extended Search Report dated Apr. 18, 2022, from counterpart European Application No. 22165140.9 filed Apr. 19, 2023, 31 pp.

Second Office Action, and translation thereof, from counterpart Chinese Application No. 202210382226.7 dated Mar. 21, 2024, 22 pp.

Communication pursuant to Article 94(3) EPC from counterpart European Application No. 22165140.9 dated Jan. 23, 2025, 11 pp.

Response to Communication pursuant to Article 94(3) EPC dated Jan. 23, 2025, from counterpart European Application No. 22165140.9 filed May 23, 2025, 13 pp.

* cited by examiner

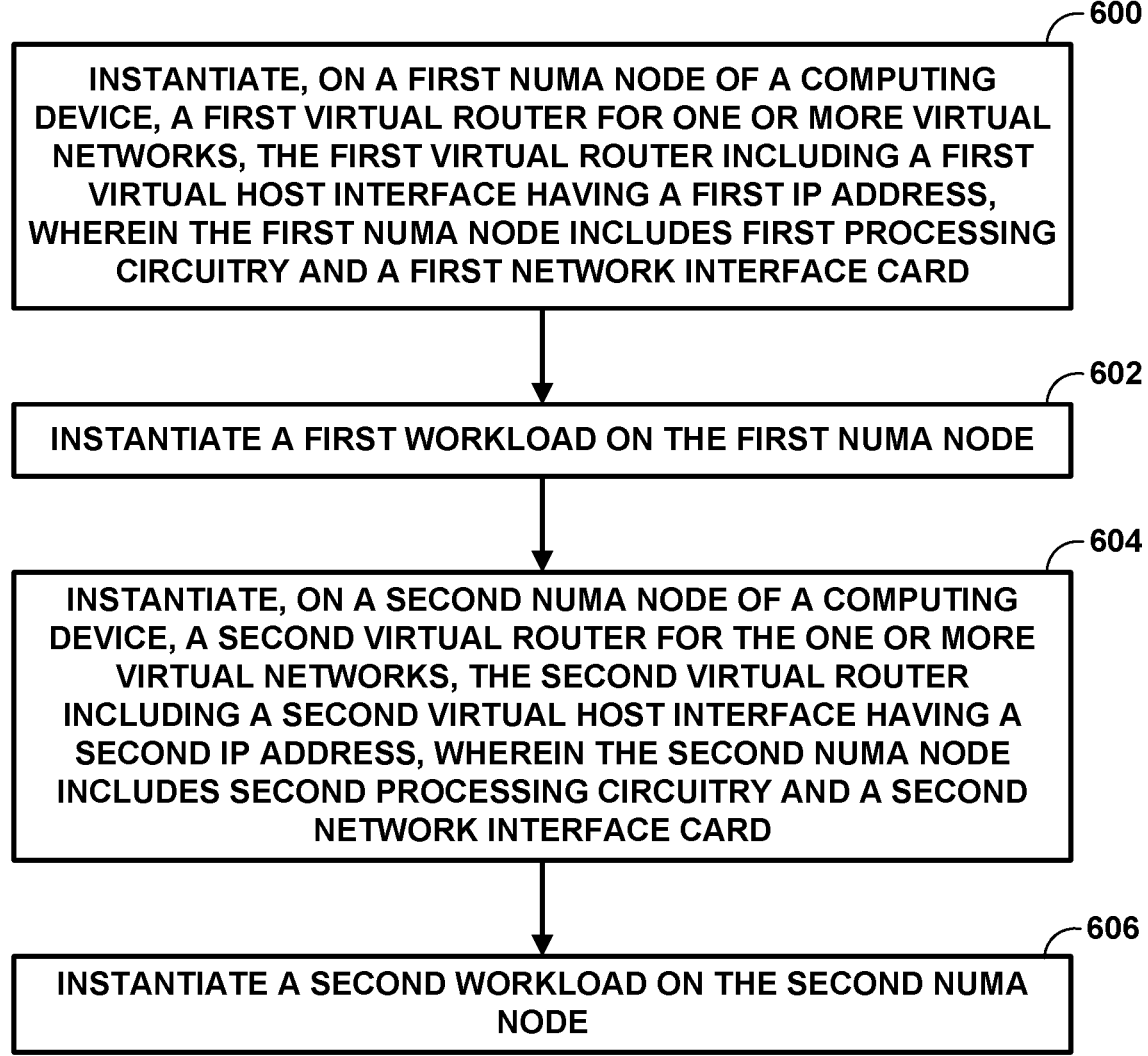

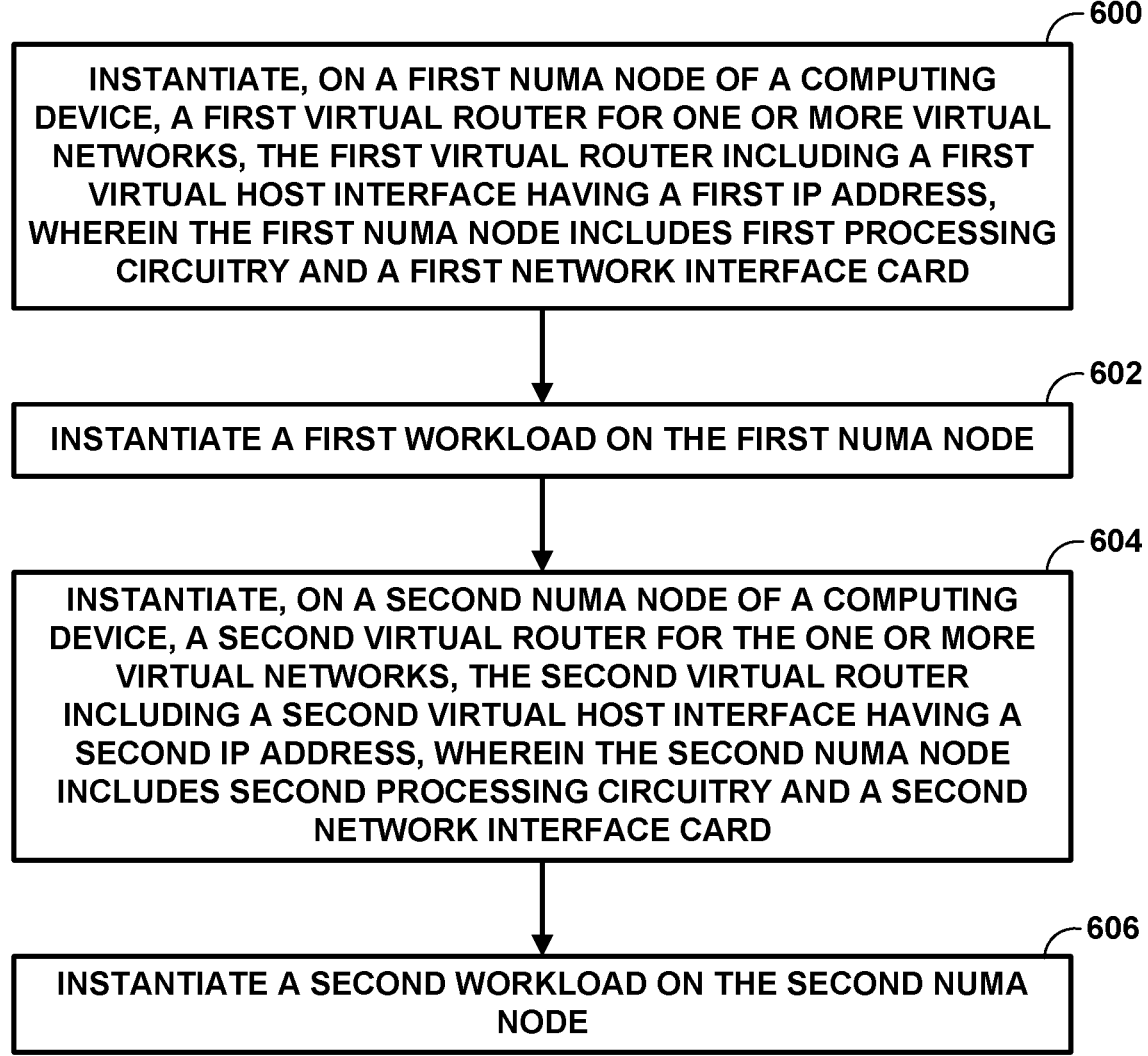

600

INSTANTIATE, ON A FIRST NUMA NODE OF A COMPUTING DEVICE, A FIRST VIRTUAL ROUTER FOR ONE OR MORE VIRTUAL NETWORKS, THE FIRST VIRTUAL ROUTER INCLUDING A FIRST VIRTUAL HOST INTERFACE HAVING A FIRST IP ADDRESS, WHEREIN THE FIRST NUMA NODE INCLUDES FIRST PROCESSING CIRCUITRY AND A FIRST NETWORK INTERFACE CARD

602

INSTANTIATE A FIRST WORKLOAD ON THE FIRST NUMA NODE

604

INSTANTIATE, ON A SECOND NUMA NODE OF A COMPUTING DEVICE, A SECOND VIRTUAL ROUTER FOR THE ONE OR MORE VIRTUAL NETWORKS, THE SECOND VIRTUAL ROUTER INCLUDING A SECOND VIRTUAL HOST INTERFACE HAVING A SECOND IP ADDRESS, WHEREIN THE SECOND NUMA NODE INCLUDES SECOND PROCESSING CIRCUITRY AND A SECOND NETWORK INTERFACE CARD

606

INSTANTIATE A SECOND WORKLOAD ON THE SECOND NUMA NODE

FIG. 6

PLURALITY OF SMART NETWORK INTERFACE CARDS ON A SINGLE COMPUTE NODE

This application claims the benefit of Indian Patent Application No. 202141017402, filed Apr. 14, 2021, and entitled "A PLURALITY OF SMART NETWORK INTERFACE CARDS ON A SINGLE COMPUTE NODE," the entire content of which is incorporated by reference herein.

TECHNICAL FIELD

The disclosure relates to a virtualized computing infrastructure and, more specifically, to deploying containers to virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (e.g., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. Containers and pods may also be referred to herein as workloads. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for deploying a logically-related group of one or more containers ("pod") that support data plane-centric software frameworks, such as containers implemented using native applications of the Data Plane Development Kit (DPDK) (referred to herein as DPDK containers), to enable fast path packet communication on a data channel between pods or workflows executing on different non-uniform memory access (NUMA) nodes, each including a network interface card (NIC). A container networking interface plugin (CNI) is a networking solution for application containers and is a runtime executable that configures a network interface into a container network namespace and configures the computing device ("host") hosting the container, which may be a member of a pod. The computing device may be alternatively referred to as a "compute node" or "server". The CNI further assigns the network address (e.g., IP address) to the network interface and may also add routes relevant for the interface, such as routes for the default gateway and one or more nameservers.

As described herein, in some examples, a control flow for deploying a pod and configuring the pod and a virtual router within a NUMA of a compute node includes creating a socket for communications between the pod and virtual router, the socket being unique to the pod and in some cases based on a pod identifier included in a pod specification. The virtual router may then share pod interface configuration data with the pod using the socket without providing access to the pod interface configuration to other pods.

In some aspects, the control flow modifies existing messages to enable the CNI to avoid querying the orchestration system for the pod identifier. Instead, the CNI may obtain the pod identifier from the virtual router (more specifically, e.g., from the virtual router agent). In some aspects, the control flow includes modifying a pod specification to add a NUMA identifier, such that a given NIC or virtual router may be configured with routing information to cause the NIC or virtual router to forward packets destined for a workflow on a different NUMA node, via an external interface of the given NIC or virtual router to an underlay switch.

In one example, a computing device includes a first non-uniform memory access (NUMA) node and a second NUMA node, wherein the first NUMA node includes: a first network interface card; a first virtual router for one or more virtual networks, the first virtual router comprising first processing circuitry and configured with a first virtual host interface having a first Internet Protocol (IP) address; and a first workload executing on the first NUMA node, and wherein the second NUMA node includes: a second network interface card; a second virtual router for the one or more virtual networks, the second virtual router comprising second processing circuitry and configured with a second virtual host interface having a second IP address; and a second workload executing on the second NUMA node.

In one example, a method includes instantiating, on a first non-uniform memory access (NUMA) node of a computing device, a first virtual router for one or more virtual networks, the first virtual router including a first virtual host interface having a first Internet Protocol (IP) address, wherein the first NUMA node includes first processing circuitry and a first network interface card; instantiating a first workload on the first NUMA node; instantiating, on a second NUMA node of the computing device, a second virtual router for the one or more virtual networks, the second virtual router including a second virtual host interface having a second IP address, wherein the second NUMA node includes second processing circuitry and a second network interface card; and instantiating a second workload on the second NUMA node.

In one example, a non-transitory computer-readable storage medium is encoded with instructions that, when executed, cause at least one processor of a computing device to instantiate, on a first non-uniform memory access (NUMA) node of the computing device, a first virtual router for one or more virtual networks, the first virtual router including a first virtual host interface having a first Internet Protocol (IP) address, wherein the first NUMA node includes first processing circuitry and a first network interface card; instantiate a first workload on a first NUMA node; instantiate, on a second NUMA node of the computing device, a second virtual router for the one or more virtual networks, the second virtual router including a second virtual host interface having a second IP address, wherein the second NUMA node includes second processing circuitry and a second network interface card; and instantiating a second workload on the second NUMA node.

The techniques of this disclosure may provide one or more technical advantages. For example, the techniques may provide for the ability to utilize multiple NICs on a single compute node and route packets between separate NUMA nodes. For example, the techniques described herein may facilitate isolation among pods executing on a same compute node. As another example, in aspects where the CNI obtains the pod identifier from the virtual router, by avoiding some communications from the CNI to the orchestration system, the techniques may reduce backlog on the orchestration system that may be caused by a large number of workloads being deployed concurrently to multiple different compute nodes.

The details of one or more examples of this disclosure are set forth in the accompanying drawings and the description below. Other features, objects, and advantages will be apparent from the description and drawings, and from the claims.

BRIEF DESCRIPTION OF DRAWINGS

FIG. 6 is an example flow diagram of example of deploying containers to virtualized computing infrastructure according to the techniques of this disclosure.

Like reference characters denote like elements throughout the description and figures.

DETAILED DESCRIPTION

Figure 1:
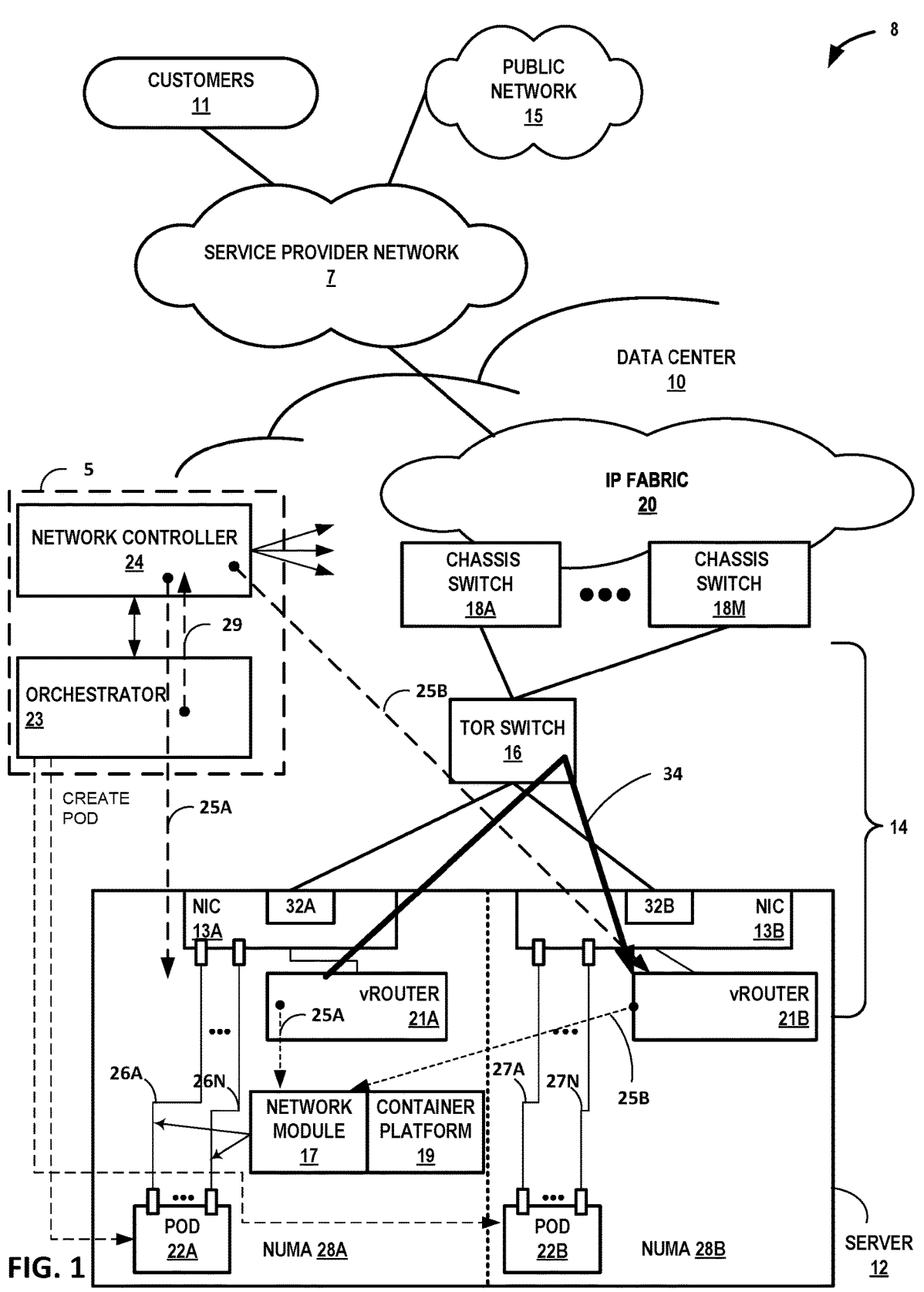
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers (or "nodes") interconnected via switch fabric 14 provided by one or more tiers of physical network switches and routers, such as server 12 depicted as coupled to top-of-rack (TOR) switch 16 via external interfaces 32A and 32B. Server 12 is a computing device and may also be referred to herein as a "host" or "host device." Although only server 12 coupled to TOR switch 16 is shown in detail in FIG. 1, data center 10 may include many additional servers coupled to other TOR switches of data center 10.

Switch fabric 14 in the illustrated example may include a plurality of TOR (or other "leaf") switches coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more PNFs such as physical firewalls, load balancers, routers, route reflectors, broadband network gateways (BNGs), Evolved Packet Cores or other cellular network elements, and other PNFs.

In some examples, TOR switch 16 and chassis switches 18 provide server 12 with redundant (multi-homed) connectivity to IP fabric 20 and service provider network 7. Chassis switches 18 aggregate traffic flows and provides connectivity between TOR switch 16 and other TOR switches (not shown for simplicity purposes). TOR switch 16 may be network device that provides layer 2 (MAC) and/or layer 3 (e.g., IP) routing and/or switching functionality. TOR switch 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Server 12 may represent a compute server or storage server. For example, server 12 may represent a computing device, such as an x86 processor-based server, configured to operate according to techniques described herein. Server 12 may provide Network Function Virtualization Infrastructure (NFVI) for an NFV architecture.

Server 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a data center 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switch fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual routers 21A-21B, virtual routers running in the virtualized server 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical server 12. (Gateway routers or switches that connect a virtual network to a physical network may be exceptions and may contain tenant MAC or IP addresses).

Virtual routers 21A and 21B of server 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21A or 21B needs to contain all IP prefixes or all MAC addresses for all virtual machines in the entire data center. A given virtual router 21A or 21B may only need to contain those routing instances that are locally present on the server 12 (e.g., which have at least one virtual execution element present on the server 12.)

The control plane protocol between the control plane nodes of the network controller 24 or a physical gateway router (or switch) may be border gateway protocol (BGP) (and may be Netconf for management). This is the same control plane protocol may also be used for MPLS L3VPNs and MPLS EVPNs. The protocol between the network controller 24 and the virtual routers 21A and 21B may be based on XMPP, for instance. The schema of the messages exchanged over XMPP may accord with Mackie et. al, "BGP-Signaled End-System IP/VPNs," draft-ietf-13vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers may be managed by their host kernel to allow limitation and prioritization of resources (CPU, memory, block input/output (I/O), network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Server 12 may host virtual network endpoints for one or more virtual networks that operate over the physical network represented in FIG. 1 by IP fabric 20 and switch fabric 14.

Although described primarily with respect to a data center-based switching network, other physical networks, such as service provider network 7, may underlay the one or more virtual networks.

Server 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12 hosts two virtual network endpoints in the form of pod 22A and pod 22B each having one or more containers. However, server 12 may execute as many virtual execution elements as is practical given hardware resource limitations of server 12. Each of the virtual network endpoints may use one or more virtual network interfaces to perform packet I/O or otherwise process a packet. For example, a virtual network endpoint may use one virtual hardware component (e.g., a Single Root I/O Virtualization (SR-IOV) virtual function) enabled by network interface card (NIC) 13A to perform packet I/O and receive/send packets on one or more communication links with TOR switch 16. Other examples of virtual network interfaces are described below.

In the example of FIG. 1, server 12 includes two separate NUMA nodes, NUMA node 28A and NUMA node 28B. Each NUMA node 28A-28B includes a NIC 13A or 13B, a virtual router 21A or 21B, and a pod 22A or 22B, respectively. Server 12 includes a plurality of NICs, for example, NIC 13A and NIC 13B, which each includes at least one external interface 32A or 32B to exchange packets with TOR switch 16 over a communication link. For example, server 12 includes a first NUMA node 28A and a second NUMA node 28B. First NUMA node 28A includes a first NIC 13A, a first virtual router 21A for one or more virtual networks, first virtual router 21A including first processing circuitry and configured with a first virtual host interface (not shown in FIG. 1) having a first Internet Protocol (IP) address, and a first workload (e.g., pod 22A) executing on first NUMA node 28A. The second NUMA node includes a second NIC 13B, a second virtual router 21B for the one or more virtual networks, second virtual router 21B including second processing circuitry and configured with a second virtual host interface (not show in FIG. 1) having a second IP address, and a second workload (e.g., pod 22B) executing on second NUMA node 28B.

Any of NICs 13A or 13B may provide one or more virtual hardware components for virtualized I/O. A virtual hardware component for I/O maybe a virtualization of a physical NIC 13A or 13B (the "physical function"). For example, in SR-IOV, which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components. As another example, server 12 may implement Virtio, a para-virtualization framework available, e.g., for the Linux Operating System, that provides emulated NIC functionality as a type of virtual hardware component to provide virtual network interfaces to virtual network endpoints. As another example, server 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, server 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by server 12.

Any of NICs 13A or 13B may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O.

Tungsten Fabric is an open-source software defined network (SDN) product. Tungsten Fabric contains many features and is a relatively high performance product. Tungsten Fabric may be suitable for both service providers and enterprises. At a high level, Tungsten Fabric has a distributed control plane (called "TF controller") that is an example of network controller 24 of FIG. 1 and a distributed data plane of virtual routers (called "vRouters" in TF) that may be examples of virtual routers 21 of FIG. 1.

One of the variants of the Tungsten Fabric data plane is a mode where operations of a virtual router (e.g., virtual router 21A or 21B) are offloaded to a smart NIC. A smart NIC may be a NIC that is capable of processing packets to perform one or more of packet encapsulation/decapsulation with tunnel headers for virtual/overlay networks, virtual routing, and so forth. Some examples of smart NICs include Netronome, Intel PAC N3000 and Mellanox ConnectX 5. In some examples, the entire virtual router may run inside the smart NIC which provides hardware acceleration. However, there can be certain packets where hardware acceleration is not possible. An example of such a packet is a first packet of a flow. These packets are handled by the regular virtual router either running as a kernel module or a DPDK application. This may be called a slow path, as there is no hardware acceleration for such a packet. The slow path is also responsible for programming the smart NIC with the forwarding state. This includes routes, next hops, vifs, MPLS/VXLAN labels, flows etc. Once the forwarding state is programmed, subsequent packets of that flow are hardware accelerated. The other components of the compute node like a virtual router agent (not shown in FIG. 1) remain the same as a non-smart NIC mode. The virtual router agent has a connection to the network controller through which the virtual router agent downloads the route and config information.

In one configuration, a compute node such as a server may include a plurality NUMAs and a single smart NIC which hosts one or more workloads (e.g., a pod) through SR-IOV interface(s). The workloads can be present in any of the NUMAs. The virtual router, which acts as a slow path, may be a DPDK application. For each workload SRIOV interface, there is a corresponding "Representator interface" which is the interface through which the smart NIC routes the exception packets (e.g., first packets of a flow) out for the slow path, e.g., for the DPDK virtual router to consume. The DPDK virtual router processes the packet as though the packet is coming from the workload and handles the packet appropriately. For example, the smart NIC may route the first packet of a flow to the virtual router agent and the virtual router agent may program the flow table. The virtual router may be communicatively coupled to the virtual router agent which may be communicatively coupled to the TF controller. This configuration functions properly as long as there is only a single smart NIC present on the compute node.

If there are more than one smart NICs on the compute node, the configuration may fail. For example, if each NUMA node of a compute node has its own smart NIC and the workload on the first smart NIC needs to send packets to a workload on second smart NIC, such a routing of packets may not be possible. Another scenario is when the first smart NIC receives a packet from an underlay switch which is destined to a workload on the second smart NIC, the configuration may again fail. This is because a virtual router treats both smart NICs as a bonded interface and is configured such that reachability to a workload should be independent of the smart NIC. Furthermore, the virtual router is configured such that workloads should be reachable irrespective of which physical interface on which the packets are received. In a configuration with multiple smart NICs, both the above configurations of virtual routers may not work.

Additional information about using smart NIC-based virtual routers may be found in https://github.com/Netronome/opencontrail-blueprints/blob/master/Hardware-Acceleration-Blueprint.md, Nov. 30, 2016, which is incorporated by reference herein in its entirety.

To overcome the above limitations of using a plurality of smart NICs on a single compute node, a configuration such as that of FIG. 1 may be utilized that includes instances of datapath components (e.g., virtual router agent, and DPDK virtual router) instantiated for each NUMA node, where each NUMA node includes one smart NIC.

A DPDK virtual router may be a DPDK application. There are restrictions on running multiple DPDK applications on the same host device. To overcome these restrictions, the virtual router may be run as a docker container. By running the virtual router as a docker container, multiple instances of virtual routers be run on the same compute node. The same is the case with the virtual router agent. With this approach, each NUMA node may act as a separate bare metal server. Each virtual router instance acts like a separate virtual tunnel endpoint. With this approach, the above-mentioned limitations may be overcome. Such a configuration may scale well since the datapath components like the DPDK virtual router and virtual router agent are simple docker containers.

With this configuration, the datapath will be NUMA aware end-to-end. That is, traffic received by the same compute node (e.g., server 12) need not cross NUMA boundaries under any circumstances to reach workloads or the datapath components (e.g., virtual router agent, or virtual router) which may improve performance.

In some examples, the smart NIC supports general purpose CPUs running linux operating system. Instead of running the datapath components on the host device, the datapath components may be run inside the smart NIC CPUs.

Server 12 may include a virtual router 21A that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12, for instance, from the underlying physical network fabric of data center 10 (e.g., IP fabric 20 and switch fabric 14) may include an outer header to allow the physical network fabric to tunnel the payload or "inner packet" to a physical network address for a network interface card 13A of server 12 that executes virtual router 21A. The outer header may include not only the physical network address of the network interface card 13A of the server, but also a virtual network identifier such as a VxLAN tag or Multiprotocol Label Switching (MPLS) label that identifies one of the virtual networks as well as the corresponding routing instance executed by virtual router 21A. An inner packet includes an inner header having a destination network address that conforms to the virtual network addressing space for the virtual network identified by the virtual network identifier.

Virtual routers 21A and 21B may terminate virtual network overlay tunnels and determine virtual networks for received packets based on tunnel encapsulation headers for the packets, and forwards packets to the appropriate destination virtual network endpoints for the packets. For server 12, for example, for each of the packets outbound from virtual network endpoints hosted by server 12 (e.g., pod 22A), virtual router 21A may attach a tunnel encapsulation header indicating the virtual network for the packet to generate an encapsulated or "tunnel" packet, and virtual router 21A may output the encapsulated packet via overlay tunnels for the virtual networks to a physical destination computing device, such as another NUMA or another server. As used herein, virtual router 21A may execute the operations of a tunnel endpoint to encapsulate inner packets sourced by virtual network endpoints to generate tunnel packets and decapsulate tunnel packets to obtain inner packets for routing to other virtual network endpoints.

For example, virtual router 21A may route packets from pod 22A to virtual router 21B via link 34 through TOR switch 16. In some examples, the first virtual router (e.g., virtual router 21A) includes a first virtual tunnel endpoint and the second virtual router (virtual router 21B) includes a second virtual tunnel endpoint.

Computing infrastructure 8 implements an automation platform for automating deployment, scaling, and operations of virtual execution elements across a plurality of servers, such as server 12, to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 may include at least servers, such as server 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to "cluster managers" and "cluster nodes."

Orchestrator 23 and network controller 24 together implement a controller 5 for the computing infrastructure 8. Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers (also referred to as "compute nodes"), such as server 12. In general, network controller 24 controls the network configuration of the data center 10 fabric to, e.g., establish one or more virtual networks for packetized communications among virtual network endpoints. Network controller 24 provides a logically, and in some cases, physically, centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. Pat. No. 9,571,394, issued on Feb. 14, 2017, and entitled "Tunneled Packet Aggregation for Virtual Networks," each which is incorporated by reference as if fully set forth herein. U.S. Pat. No. 9,571,394 also includes further description of a virtual router, such as virtual router 21A.

In general, orchestrator 23 controls the deployment, scaling, and operations of virtual execution elements across clusters of servers and provides computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12 includes a container platform 19 for running containerized applications, such as those of pod 22A and pod 22B. Container platform 19 receives requests from orchestrator 23 to obtain and host, in server 12, containers. Container platform 19 obtains and executes the containers.

Container platform 19 includes a network module 17 that configures virtual network interfaces for virtual network endpoints. The container platform 19 uses network module 17 to manage networking for pods, including pod 22A and pod 22B. For example, the network module 17 creates virtual network interfaces to connect pod 22A to virtual router 21A (in some examples, via NIC 13A) and enable containers of such pods to communicate, via the virtual network interfaces, to other virtual network endpoints over the virtual networks. Network module 17 may, for example, insert a virtual network interface for a virtual network into the network namespace for containers of in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. Network module 17 may assign a network address (e.g., a virtual IP address for the virtual network) and may setup routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

Network module 17 may represent a library, a plugin, a module, a runtime, or other executable code for server 12. Network module 17 may conform, at least in part, to the Container Networking Interface (CNI) specification or the rkt Networking Proposal. Network module 17 may represent a Contrail, OpenContrail, or other network plugin. Network module 17 may alternatively be referred to as a network plugin or CNI plugin or CNI instance. For purposes of the CNI specification, a container can be considered synonymous with a Linux network namespace. What unit this corresponds to depends on a particular container runtime implementation: for example, in implementations of the application container specification, such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g., a router). Containers can be conceptually added to or removed from one or more networks.

The CNI specification specifies a number of considerations for a conforming plugin ("CNI plugin"). A network module 17 may configure, for pod 22A, one or more virtual network interfaces 26A-26N ("virtual network interfaces") for corresponding virtual networks configured in switch fabric 14, where any of the containers of the pod 22A may utilize, e.g., share, any of the multiple virtual network interfaces 26. In this way, and as described further below, network module 17 addresses certain limitations of CNI plugins that conform strictly to the CNI specification.

Each of virtual network interfaces 26 may represent a virtual ethernet ("veth") pair, where each end of the pair is a separate device (e.g., a Linux/Unix device), with one end of the pair assigned to pod 22A and one end of the pair assigned to NIC 13A. The veth pair or an end of a veth pair are sometimes referred to as "ports". Each of virtual network interfaces 26 may alternatively represent a macvlan network with media access control (MAC) addresses assigned to pod 22A and to NIC 13A for communications between containers of pod 22A and NIC 13A. Each of virtual network interfaces 26 may alternatively represent a different type of interface between NIC 13A or other network virtualization entity and virtual network endpoints. Virtual network interfaces 26 may alternatively be referred to as virtual machine interfaces (VMIs), pod interfaces, container network interfaces, tap interfaces, veth interfaces, or simply network interfaces (in specific contexts), for instance.

In the example server 12 of FIG. 1, pod 22A is a virtual network endpoint in multiple different virtual networks. Orchestrator 23 may store or otherwise manage configuration data for application deployments that specifies the multiple virtual networks and specifies that pod 22A (or the one or more containers therein) is a virtual network endpoint of each of the multiple virtual networks. Orchestrator 23 may receive the configuration data from a user, operator/administrator, or other machine system, for instance.

As part of the process of creating pod 22A, orchestrator 23 sends request 29 to request that network controller 24 create respective virtual network interfaces for the multiple virtual networks (indicated in the configuration data). Network controller 24 processes request 29 to generate interface configuration data 25A or interface configuration data 25B for the multiple virtual network interfaces 26 for pod 22A or multiple virtual network interfaces 27A-27N for pod 22B, respectively. Interface configuration data 25A and interface configuration data 25B may include a container or pod unique identifier and a list or other data structure specifying, for each of virtual network interface 26 or for each of virtual network interface 27, network configuration data for configuring the virtual network interface. Network configuration data for a virtual network interface may include a network name, assigned virtual network address, MAC address, and/or domain name server values. An example of network configuration data in Javascript Object Notation (JSON) format is below. The multiple virtual network interfaces 26 or multiple virtual network interfaces 27 correspond, respectively, to the multiple virtual networks. Network controller 24 sends interface configuration data 25A or 25B to server 12 and, more specifically in some cases, to virtual router 21A or virtual router 21B. To configure one or more virtual network interfaces for pod 22A or pod 22B, container platform 19 may, in some implementations, invoke a single instance of network module 17. The network module 17 obtains and processes the interface configuration data 25A or 25B. For each virtual network interface specified in the interface configuration data 25A or 25B, the network module 17 creates one of virtual network interfaces 26 or 27, respectively. For example, network module 17 may attach one end of a veth pair implementing virtual network interface 26A to NIC 13A and/or virtual router 21A and may attach the other end of the same veth pair to pod 22A. Similarly, network module 17 may attach one end of a veth pair implementing virtual network interface 26N to NIC 13A and/or virtual router 21A and may attach the other end of the same veth pair to pod 22A. In this way, a single instance of network module 17 configures multiple virtual network interfaces 26 for one or more virtual execution element that share at least one virtual network interface, in this case pod 22A.

The following is example network configuration data for pod 22A for multiple virtual network interfaces 26A-26N, where in this case, N=3.

```
[{
    // virtual network interface 26A
    "id": "fe4bab62-a716-11e8-abd5-0cc47a698428",
    "instance-id": "fe3edca5-a716-11e8-822c-0cc47a698428",
    "ip-address": "10.47.255.250",
    "plen": 12,
```

-continued

```
    "vn-id": "56dda39c-5e99-4a28-855e-6ce378982888",
    "vm-project-id": "00000000-0000-0000-0000-000000000000",
    "mac-address": "02:fe:4b:ab:62:a7",
    "system-name": "tapeth0fe3edca",
    "rx-vlan-id": 65535,
    "tx-vlan-id": 65535,
    "vhostuser-mode": 0,
    "v6-ip-address": "::",
    "v6-plen": ,
    "v6-dns-server": "::",
    "v6-gateway": "::",
    "dns-server": "10.47.255.253",
    "gateway": "10.47.255.254",
    "author": "/usr/bin/contrail-vrouter-agent",
    "time": "426404:56:19.863169"
},{
    // virtual network interface 26B
    "id": "fe611a38-a716-11e8-abd5-0cc47a698428",
    "instance-id": "fe3edca5-a716-11e8-822c-0cc47a698428",
    "ip-address": "30.1.1.252",
    "plen": 24,
    "vn-id": "b0951136-a702-43d2-9e90-3e5a9343659d",
    "vm-project-id": "00000000-0000-0000-0000-000000000000",
    "mac-address": "02:fe:61:1a:38:a7",
    "system-name": "tapeth1fe3edca",
    "rx-vlan-id": 65535,
    "tx-vlan-id": 65535,
    "vhostuser-mode": 0,
    "v6-ip-address": "::",
    "v6-plen": ,
    "v6-dns-server": "::",
    "v6-gateway": "::",
    "dns-server": "30.1.1.253",
    "gateway": "30.1.1.254",
    "author": "/usr/bin/contrail-vrouter-agent",
    "time": "426404:56:19.863380"
},{
    // virtual network interface 26N
    "id": "fe7a52aa-a716-11e8-abd5-0cc47a698428",
    "instance-id": "fe3edca5-a716-11e8-822c-0cc47a698428",
    "ip-address": "40.1.1.252",
    "plen": 24,
    "ip6-address": "::",
    "vn-id": "200cb1e6-7138-4a55-a8df-936bb7515052",
    "vm-project-id": "00000000-0000-0000-0000-000000000000",
    "mac-address": "02:fe:7a:52:aa:a7",
    "system-name": "tapeth2fe3edca",
    "rx-vlan-id": 65535,
    "tx-vlan-id": 65535,
    "vhostuser-mode": 0,
    "v6-ip-address": "::",
    "v6-plen": ,
    "v6-dns-server": "::",
    "v6-gateway": "::",
    "dns-server": "40.1.1.253",
    "gateway": "40.1.1.254",
    "author": "/usr/bin/contrail-vrouter-agent",
    "time": "426404:56:19.863556"
}]
```

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The Add command supports only adding a single virtual network and must be invoked multiple times in order to add a pod to multiple virtual networks. A single network module 17 invoked by container platform 19 extends the functionality of a conventional CNI plugin by obtaining interface configuration data 25A or 25B and adding multiple different virtual network interfaces 26 or 27. The term "invoke" may refer to the instantiation, as executable code, of a software component or module in memory (e.g., user space 245) for execution by microprocessor 210.

Figure 2:
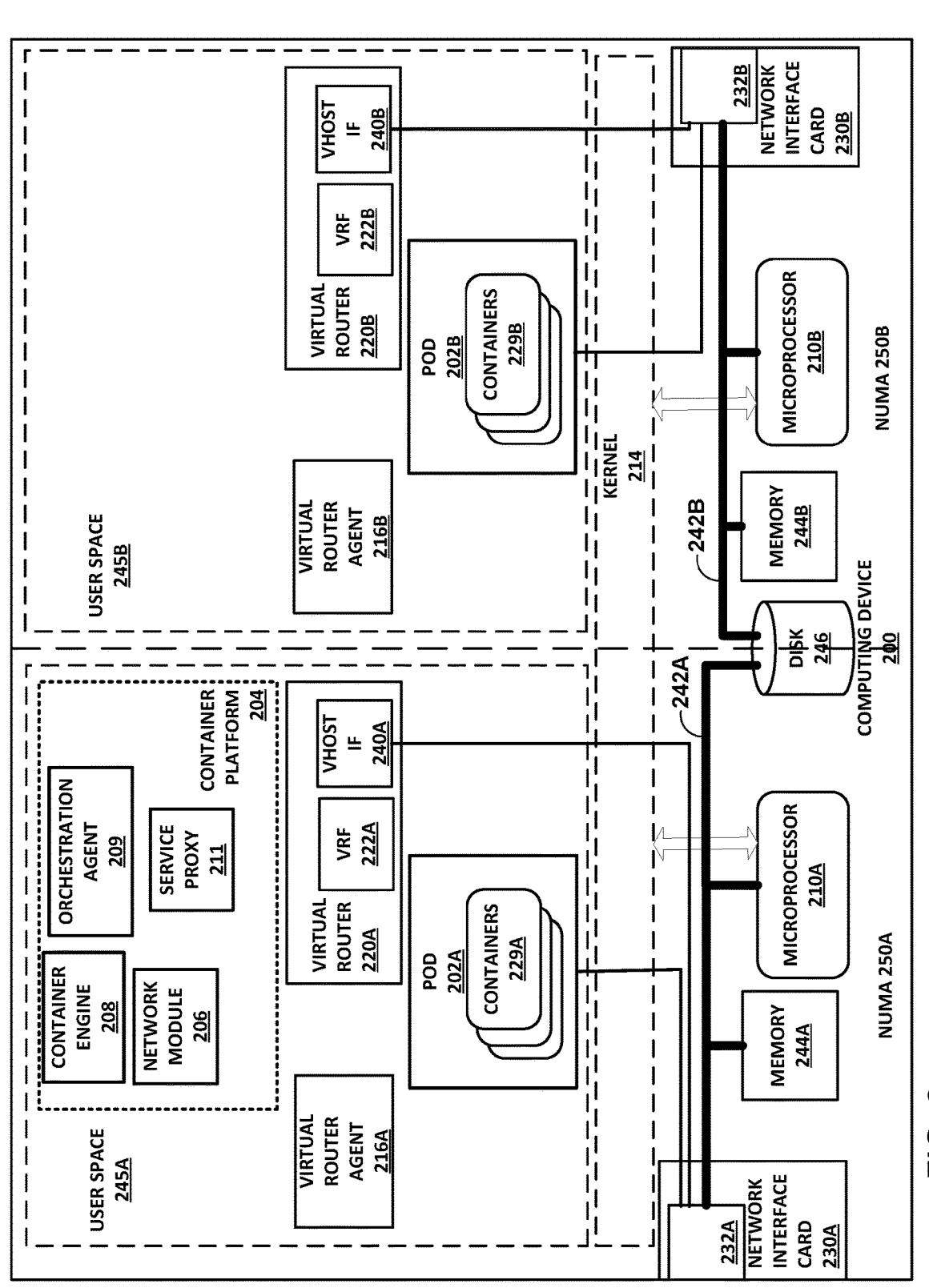
FIG. 2 is a block diagram of an example computing device (e.g., host) that includes a network module for configuring virtual network interfaces for a set of one or more virtual execution elements, according to techniques described in this disclosure.

FIG. 2 is a block diagram of an example computing device (e.g., host) that includes a network module for configuring virtual network interfaces for a set of one or more virtual execution elements, according to techniques described in this disclosure. Computing device 200 of FIG. 2 may represent a real or virtual server and may represent an example instance of server 12 of FIG. 1. Computing device 200 includes in this example, a bus 242A and bus 242B coupling hardware components of a computing device 200 hardware environment. Bus 242A couples NIC 230A, storage disk 246, and one or more microprocessors 210A (hereinafter, "microprocessor 210A"). NIC 230A may be SR-IOV-capable. A front-side bus may in some cases couple microprocessor 210A and memory device 244A. In some examples, bus 242A may couple memory device 244A, microprocessor 210A, and NIC 230A. Bus 242A may represent a Peripheral Component Interface (PCI) express (PCIe) bus. In some examples, a direct memory access (DMA) controller may control DMA transfers among components coupled to bus 242A. In some examples, components coupled to bus 242A control DMA transfers among components coupled to bus 242A. Similarly, bus 242B couples NIC 230B, storage disk 246, and one or more microprocessors 210B (hereinafter, "microprocessor 210B"). NIC 230B may be SR-IOV-capable. A front-side bus may in some cases couple microprocessor 210B and memory device 244B. In some examples, bus 242B may couple memory device 244B, microprocessor 210B, and NIC 230B. Bus 242B may represent a Peripheral Component Interface (PCI) express (PCIe) bus. In some examples, a direct memory access (DMA) controller may control DMA transfers among components coupled to bus 242B. In some examples, components coupled to bus 242B control DMA transfers among components coupled to bus 242B.

Microprocessor 210A or 210B may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210A or 210B.

Memory device 244A or 244B includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory device 244A or 244B provides a physical address space composed of addressable memory locations.

NIC 230A or NIC 230B include one or more physical interfaces 232A or 232B, respectively, configured to exchange packets using links of an underlying physical network, such as TOR switch 16 of FIG. 1. Physical interfaces 232A or 232B may include a port interface card having one or more network ports. NIC 230A or 230B may also include an on-card memory (not shown for simplicity purposes) to, e.g., store packet data. Direct memory access transfers between the NIC 230A and other devices coupled to bus 242A may read/write from/to the NIC memory. Similarly, direct memory access transfers between the NIC 230B and other devices coupled to bus 242B may read/write from/to the NIC memory.

Memory device 244A, NIC 230A, storage disk 246, microprocessor 210A, memory device 244B, NIC 230B, and microprocessor 210B may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245A and 245B.

Kernel 214 includes a physical driver (not shown for simplicity purposes) to use NIC 230A and a physical driver (not shown for simplicity purposes) to use NIC 230B. NIC 230A or NIC 230B may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230A or NIC 230B, which therefore appears to each of the virtual execution elements as a dedicated NIC. Virtual functions may represent lightweight PCIe functions that share physical resources with a physical function used by a physical driver and with other virtual functions. For an SR-IOV-capable NIC, NIC 230A or NIC 230B may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220A or 220B. Virtual routers may be processes or threads, or a component thereof, executed by the physical servers, e.g., server 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by computing device 200.

Virtual router 220A or 220B can be executing as a kernel module or as a user space DPDK process (virtual router 220A and 220B are shown here in user space 245A and 245B, respectively). Virtual router agent 216A or 216B may also be executing in user space 245A or 245B, respectively. In the example computing device 200 of FIG. 2, virtual router 220A and 220B each execute within a separate instance of user space as a DPDK-based virtual router, but virtual router 220A and 220B may execute within a hypervisor, a host operating system, a host application, or a virtual machine in various implementations. Virtual router agent 216A and 216B each has a connection to network controller 24 of FIG. 1 using a channel, which is used to download configurations and forwarding information. Virtual router agent 216A and 216B programs this forwarding state to the virtual router data (or "forwarding") plane represented by virtual router 220A and 220B, respectively. Virtual router 220A, 220B, virtual router agent 216A, and 216B may be processes.

Virtual router 220A or 220B may replace and subsume the virtual routing/bridging functionality of the Linux bridge/ OVS module that is commonly used for Kubernetes deployments of pod 202A or 202B, respectively. Virtual router 220A or 220B may perform bridging (e.g., E-VPN) and routing (e.g., L3VPN, IP-VPNs) for virtual networks. Virtual router 220A or 220B may perform networking services such as applying security policies, NAT, multicast, mirroring, and load balancing.

Virtual router 220A or 220B may be multi-threaded and execute on one or more processor cores. Virtual router 220A or 220B may include multiple queues. Virtual router 220A or 220B may implement a packet processing pipeline. The pipeline can be stitched by the virtual router agent 216A or 216B from the simplest to the most complicated manner depending on the operations to be applied to a packet. Virtual router 220A or 220B may maintain multiple instances of forwarding bases. Virtual router 220A or 220B may access and update tables using RCU (Read Copy Update) locks.

To send packets to other compute nodes or switches, virtual router 220A or 220B uses one or more physical interfaces 232A or 232B, respectively. In general, virtual router 220A or 220B exchanges overlay packets with workloads, such as VMs or pods 202A or 202B, respectively. Virtual router 220A or 220B has multiple virtual network interfaces (e.g., vifs). These interfaces may include the kernel interface, vhost interface 240A (e.g., vhost0) or vhost interface 240B (e.g., vhost1), for exchanging packets with the host operating system; an interface with virtual router agent 216A (e.g., pkt0) or virtual router agent 216B (e.g., pkt1), to obtain forwarding state from the network controller and to send up exception packets. There may be one or more virtual network interfaces corresponding to the one or more physical interfaces 232A or 232B. Other virtual network interfaces of virtual router 220A or 220B are for exchanging packets with the workloads.

In a kernel-based deployment of virtual router 220A, virtual router 220A is installed as a kernel module inside the operating system. Virtual router 220A registers itself with the TCP/IP stack to receive packets from any of the desired operating system interfaces that it wants to. The interfaces can be bond, physical, tap (for VMs), veth (for containers) etc. Virtual router 220A in this mode relies on the operating system to send and receive packets from different interfaces. For example, the operating system may expose a tap interface backed by a vhost-net driver to communicate with VMs. Once virtual router 220A registers for packets from this tap interface, the TCP/IP stack sends all the packets to it. Virtual router 220A sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance. In a kernel-based deployment of virtual router 220B, the same may be true of virtual router 220B.

In a DPDK-based deployment of virtual router 220A (shown in FIG. 2), virtual router 220A is installed as a user space 245A application that is linked to the DPDK library. In a DPDK-based deployment of virtual router 220B (shown in FIG. 2), virtual router 220B is installed as a user space 245B application that is linked to the DPDK library. This may lead to faster performance than a kernel-based deployment, particularly in the presence of high packet rates. The physical interfaces 232A and 232B are used by the poll mode drivers (PMDs) of DPDK rather the kernel's interrupt-based drivers. The registers of physical interfaces 232A or 232B may be exposed into user space 245A or 245B, respectively, in order to be accessible to the PMDs. For example, physical interface 232A bound in this way is no longer managed by or visible to the host operating system, and the DPDK-based virtual router 220A manages the physical interface 232A. This includes packet polling, packet processing, and packet forwarding. In other words, user packet processing steps are performed by the virtual router 220A DPDK data plane. The nature of this "polling mode" makes the virtual router 220A DPDK data plane packet processing/forwarding much more efficient as compared to the interrupt mode when the packet rate is high. There are comparatively few interrupts and context switching during packet I/O, compared to kernel-mode virtual router 220A, and interrupt and context switching during packet I/O may in some cases be avoided altogether.

In general, each of pods 202A-202B may be assigned one or more virtual network addresses for use within respective virtual networks, where each of the virtual networks may be associated with a different virtual subnet provided by virtual router 220A or virtual router 220B. Pod 202B may be assigned its own virtual layer three (L3) IP address, for example, for sending and receiving communications but may be unaware of an IP address of the computing device 200 on which the pod 202B is executing. The virtual network address may thus differ from the logical address for the underlying, physical computer system, e.g., computing device 200.

In the example of FIG. 2, for each NUMA node having a smart NIC, in this case NUMA NODE 250A and NUMA NODE 250B, there is an instance of the virtual router agent (virtual router agent 216A or 216B) and virtual router (virtual router 220A or 220B) processes. In some examples, the name of an instance has the suffix of a NUMA node identifier. For example, vrouter_agent_1 is the virtual router agent process of NUMA node 1 (NUMA NODE 250B).

Similarly, vrouter_dpdk_0 is the virtual router process of NUMA node 0 (NUMA NODE 250A). In general, a NUMA node (or "NUMA" for short) is collection of hardware having lower latency memory access to one another. Access to memory device 244A-244B is non-uniform for microprocessors 210A and 210B. Microprocessor 210A and NIC 230A have lower-latency access to memory device 244A than to memory device 244B, and microprocessor 210B and NIC 230B have lower-latency access to memory device 244B than to memory device 244A. Software executing on microprocessors 210 or NICs 230 may therefore be configured with preference to the lower-latency memory device 244, and this arrangement or collection of hardware and software may be referred to as different NUMA nodes within computing device 200.

Each virtual router instance may host a control-data IP address through which the virtual router instance is reachable. This is the underlay IP address assigned to an interface called vhost0. In some examples, each NUMA having a smart NIC includes a "vhost" interface like vhost1, vhost2 etc., where the suffix denotes the NUMA node identifier. For example, vhost0 is the "vhost" interface (vhost IF 240A) for NUMA 0 (NUMA NODE 250A), vhost1 is the "vhost" interface (vhost IF 240B) for NUMA 1 (NUMA NODE 250B), and so on.

Virtual router agent 216A communicates with virtual router 220A via an interface called pkt0 (not shown for simplicity purposes). The corresponding unix socket name is "agent_pkt0" and "dpdk_pkt0". As with the vhost interface (e.g., vhost IF 240A or 240B), a suffix to the socket name which denotes the NUMA identifier may be used, for example "agent_pkt0_0", "agent_pkt0_1". The "_0" and "_1" denotes the NUMA identifier. For example, virtual router agent 216A or virtual router 220A may establish a connection therebetween by each adding the NUMA identifier suffix on which it is running (e.g., 0).

When a workload (e.g., a virtual machine or pod) is instantiated on a NUMA node, the correct virtual router agent instance which is running on that NUMA node needs to be notified. This may be performed via "vrouter_port-_control" script for openstack or the contrail CNI for Kubernetes. This eventually translates to a "Port Add" to the smart MC and the virtual router agent advertises its reachability of the appropriate "vhost" interface corresponding to that NUMA node. For example, if a workload is instantiated on NUMA1 (e.g., NUMA NODE 250B), vrouter_agent_1 (virtual router agent 216B) receives a notification from orchestration agent 209 running on the server 12. The vrouter-_agent_1 in turn programs the vrouter_dpdk_1 process (virtual router 220B) with the "port_add." The vrouter-_agent_1 also notifies controller 5 that the next hop for the workload is vhost1's IP address.

In this way, each NUMA node operates similarly as an independent bare metal server. From the controller point of view, the controller sees the compute node as two separate compute nodes in its routing tables.

As such, the underlay switch automatically sends the packets destined to a workload on the port connected to the correct smart NIC. Further, for packets between workloads on the same compute node, the routes will be setup such that the smart NIC sends the packets out on an external interface of the smart NIC to TOR switch 16. TOR switch 16 may then send packets to another external interface port of another smart NIC which in part of the NUMA running the destination workload.

For example, a second virtual router (e.g., virtual router 200B) is configured with routing information to cause the second virtual router to forward packets, destined for a first workload (e.g., pod 202A) of the first NUMA node (e.g., NUMA NODE 250A), via an external interface (e.g., physical interface 232B) of the second NIC (e.g., NIC 13B) to an underlay switch (e.g., TOR switch 16). Likewise, the first virtual router (e.g., virtual router 200A) is configured with routing information to cause the first virtual router to forward packets, destined for the second workload (e.g., pod 202B) of the second NUMA node (e.g., NUMA NODE 250B), via an external interface (e.g., physical interface 232B) of the first NIC (e.g., NIC 13A) to an underlay switch (e.g., TOR switch 16).

In some examples, the first IP address and the second IP address are IP addresses for an underlay network (e.g., TOR switch 16, chassis switches 18A-18M, and/or IP fabric 20 of FIG. 1) coupled to the first NIC (NIC 13A) and the second NIC (NIC 13B). In some examples, the first virtual router is a DPDK-based virtual router executing as a third workload (e.g., one of containers 229A in pod 202A) of the first NUMA (NUMA NODE 250A) and the first virtual host interface (vhost IF 240A) includes a virtual network interface configured for the third workload.

In some examples, the first virtual router (virtual router 220A) includes a first virtual tunnel endpoint and the second virtual router (virtual router 220B) includes a second virtual tunnel endpoint. In some examples, server 12 includes a virtual router agent 216A for the first virtual router, virtual router agent 216A being configured to send the first IP address to controller 5.

In some examples, server 12 includes a network module 206 (which, in some examples, may be a plugin) configured to obtain, for the first workload (e.g., pod 202A), a NUMA identifier associated with the first NUMA node (e.g., NUMA NODE 250A) and determine that the NUMA identifier is associated with the first NUMA node. In some examples, server 12 includes virtual router agent 216A for the first virtual router (virtual router 220A), wherein the network module is configured to request, in response to determining the NUMA identifier is associated with the first NUMA node, the virtual router agent 216A being configured to, in response to the request, add a virtual network interface (vhost IF 240A) for the first workload (pod 202A) to the first router virtual. In some examples, virtual router agent 216A is further configured to send the first IP address to controller 5 to indicate the first IP address is a next hop for the first workload.

In some examples, a method may include instantiating any of the processes discussed herein.

In some examples, an administrator may specify the NUMA node on which the administrator wants the workload to run. This way the administrator may have more granular control. Alternatively, depending on the scheduler policy, the workloads may be automatically instantiated in a round robin manner for each NUMA node by the scheduler. If the administrator chooses a default scheduler policy, the workloads may be instantiated in NUMA node 0 and the administrator may not take advantage of the multiple smart NICs.

There are also some memory considerations. Due to the fact that a plurality of instances of virtual router applications are running, the administrator may partition the available hugepage memory between the plurality of virtual router applications depending on the workload requirements. For example, the administrator may mount multiple hugetlbfs filesystems and provide a unique mount path to each virtual router application. The administrator also may partition the physical CPUs across different virtual router instances.

Computing device 200 includes NUMA NODE 250A and NUMA NODE 250B. NUMA NODE 250A includes a virtual router agent 216A that controls the overlay of virtual networks for NUMA NODE 250A and that coordinates the routing of data packets within NUMA NODE 250A. Similarly, NUMA NODE 250B includes a virtual router agent 216B that controls the overlay of virtual networks for NUMA NODE 250B and that coordinates the routing of data packets within NUMA NODE 250B. In general, virtual router agent 216A or 216B communicates with network controller 24 for the virtualization infrastructure, which generates commands to create virtual networks and configure network virtualization endpoints, such as computing device 200 and, more specifically, virtual router 220A or 220B. By configuring virtual router 220A or 220B based on information received from network controller 24 (FIG. 1), virtual router agent 216A or 216B may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220A or 220B. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc.

As noted above, a network controller 24 (FIG. 1) may provide a logically centralized controller for facilitating operation of one or more virtual networks. Network controller 24 may, for example, maintain a routing information base, e.g., one or more routing tables that store routing information for the physical network as well as one or more overlay networks. Virtual router 220A or 220B implements one or more virtual routing and forwarding instances (VRFs) 222A-222B for respective virtual networks for which virtual router 220A or 220B operates as respective tunnel endpoints. In general, each VRF 222A or 222B stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222A or 222B may include a network forwarding table storing routing and forwarding information for the virtual network.

NIC 230A or 230B may receive tunnel packets. Virtual router 220A or 220B processes the tunnel packet to determine, from the tunnel encapsulation header, the virtual network of the source and destination endpoints for the inner packet. Virtual router 220A or 220B may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to a virtual network interface, such as virtual network interface 26A of FIG. 1. VRF 222A forwards the inner packet via virtual network interface 26A to POD 202A in response.

Containers 229A-229B may also source inner packets as source virtual network endpoints. Container 229A, for instance, may generate a layer 3 inner packet destined for a destination virtual network endpoint that is executed by another computing device (i.e., not computing device 200) or for another one of containers 229A-229B. Container 229A sends the layer 3 inner packet to virtual router 220A via a virtual network interface attached to VRF 222A. Similarly, container 229B, may generate a layer 3 inner packet destined for a destination virtual network endpoint that is executed by another computing device (i.e., not computing device 200) or for another one of containers 229A-229B. Container 229B sends the layer 3 inner packet to virtual router 220B via a virtual network interface attached to VRF 222B.

Virtual router 220A or 220B receives the inner packet and layer 2 header and determines a virtual network for the inner packet. Virtual router 220A or 220B may determine the virtual network using any of the above-described virtual network interface implementation techniques (e.g., macvlan, veth, etc.). For example, virtual router 220A uses the VRF 222A corresponding to the virtual network for the inner packet to generate an outer header for the inner packet, the outer header including an outer IP header for the overlay tunnel and a tunnel encapsulation header identifying the virtual network. Virtual router 220A encapsulates the inner packet with the outer header. Virtual router 220A may encapsulate the tunnel packet with a new layer 2 header having a destination layer 2 address associated with a device external to the computing device 200, e.g., a TOR switch 16 or a server. If external to computing device 200, virtual router 220A outputs the tunnel packet with the new layer 2 header to NIC 230A. NIC 230A outputs the packet on an external interface (e.g., physical interface 232A). If the destination is another virtual network endpoint executing on computing device 200 in NUMA NODE 250B, virtual router 220A may route the packet to through TOR switch 16 (FIG. 1) to virtual router 220B executing in NUMA NODE 250B.

In some examples, a controller for computing device 200 (e.g., network controller 24 of FIG. 1) configures a default route in each of pods 202A and 202B to use virtual router 220A or virtual router 220B, respectfully, as an initial next hop for outbound packets.

Pods 202A-202B may represent example instances of pod 22A or pod 22B of FIG. 1, in further detail. Pod 202A includes one or more containers 229A, and pod 202B includes one or more containers 229B.

Container platform 204 may represent an example instance of container platform 19A of FIG. 1, in further detail. Container platform 204 include container engine 208, orchestration agent 209, service proxy 211, and network module 206. Network module 206 may represent an example instance of network module 17A of FIG. 1.

Container engine 208 includes code executable by microprocessor 210A. Container engine 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container.

A container is an executable instance of an image. Based on directives from orchestration agent 209, container engine 208 may obtain images and instantiate them as executable containers 229A-229B in pods 202A-202B.

Service proxy 211 includes code executable by micropro-cessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220A and pods 202A-202B by network module 206.

Orchestration agent 209 includes code executable by microprocessor 210. Orchestration agent 209 may be one or more computer processes. Orchestration agent 209 may represent a kubelet for a minion node of a Kubernetes cluster. Orchestration agent 209 is an agent of an orchestra-tor, e.g., orchestrator 23 of FIG. 1, that receives container specification data for containers and ensures the containers execute by computing device 200. Container specification data may be in the form of a manifest file sent to orches-tration agent 209 from orchestrator 23 or indirectly received via a command line interface, HTTP endpoint, or HTTP server. Container specification data may be a pod specifi-cation (e.g., a PodSpec—a YAML (Yet Another Markup Language) or JSON object that describes a pod) for one of pods 202A or 202B. A pod specification may also be referred to as a manifest. Based on the container specification data, orchestration agent 209 directs container engine 208 to obtain and instantiate the container images for containers 229A-229B, for execution of containers 229 by computing device 200. In some examples, a pod specification may include, or be modified to include, a NUMA identifier, specifying the NUMA on which the pod may be executed.

Orchestration agent 209 instantiates network module 206 to configure one or more virtual network interfaces for each of pods 202A-202B. Network modules 206 may represent an example instance of network module 17A of FIG. 1. For example, orchestration agent 209 receives a container speci-fication data for pod 202A and directs container engine 208 to create the pod 202A with containers 229A based on the container specification data for pod 202A. Orchestration agent 209 also invokes the network module 206 to configure, for pod 202A, a virtual network interface(s) for a virtual network corresponding to VRFs 222A. In this example, pod 202A and pod 202B are virtual network endpoints for the virtual networks corresponding to VRF 222A and VRF 222B.

Network module 206 may obtain interface configuration data for configuring virtual network interfaces for pods 202A-202B. Virtual router agent 216A operates as a virtual network control plane module for enabling network control-ler 24 to configure virtual router 220A. Similarly, virtual router agent 216B operates as a virtual network control plane module for enabling network controller 24 to config-ure virtual router 220B. Unlike the orchestration control plane (including the container platform 204 for minion nodes and the master node(s), e.g., orchestrator 23), which manages the provisioning, scheduling, and managing virtual execution elements, a virtual network control plane (including network controller 24 and virtual router agents 216A-216B for minion nodes) manages the configuration of virtual networks implemented in the data plane in part by virtual routers 220A-220B of the minion nodes. Virtual router agent 216A or 216B communicates, to network module 206, interface configuration data for virtual network interfaces to enable an orchestration control plane element (e.g., network module 206) to configure the virtual network interfaces according to the configuration state determined by the network controller 24, thus bridging the gap between the orchestration control plane and virtual network control plane. In addition, this may enable a network module 206 to obtain interface configuration data for multiple virtual net-work interfaces for a pod and configure the multiple virtual network interfaces, which may reduce communication and resource overhead inherent with invoking a separate net-work module 206 for configuring each virtual network interface.

Figure 3:
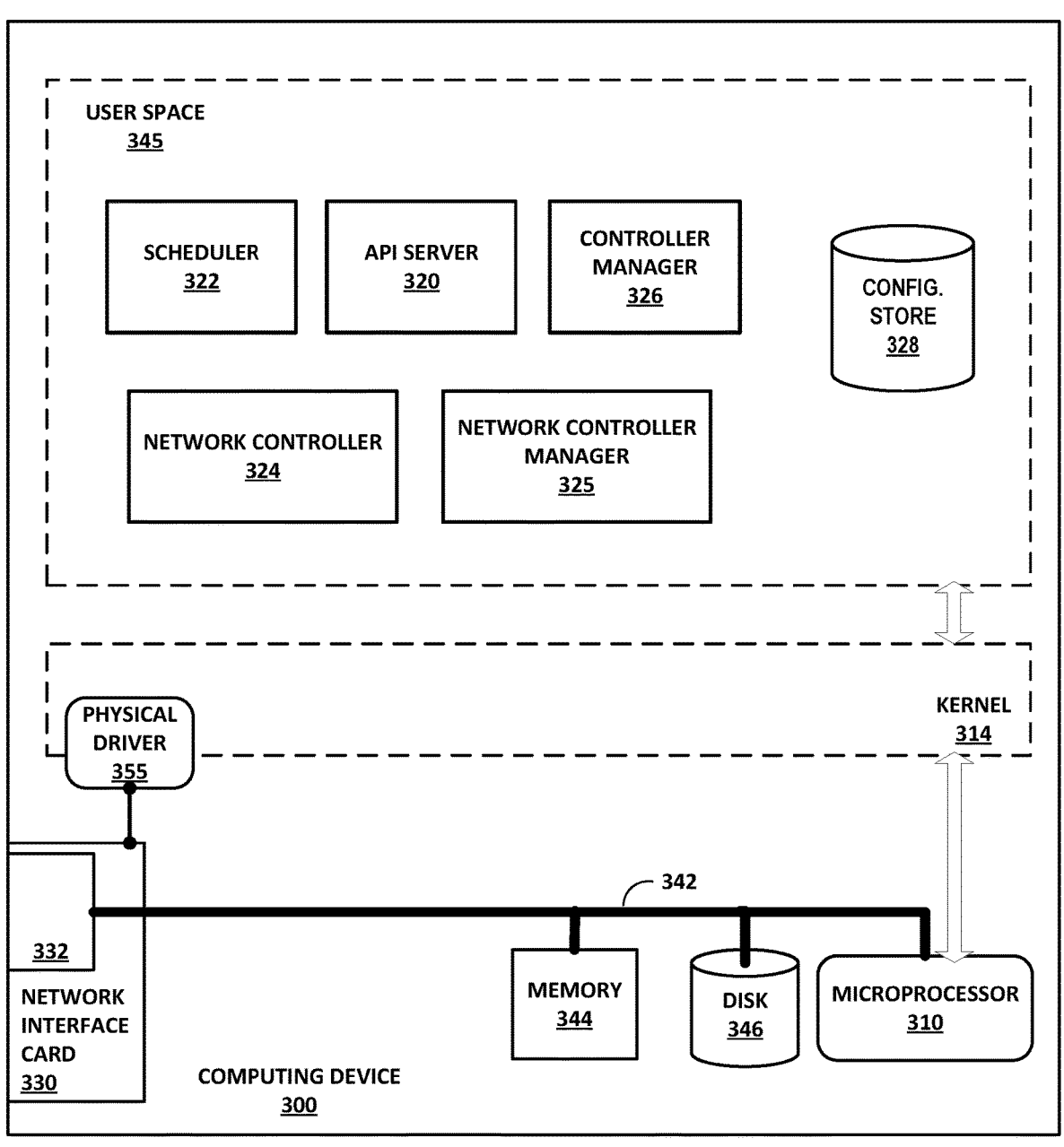
FIG. 3 is a block diagram of an example computing device operating as an instance of a controller for a virtualized computing infrastructure, according to techniques described in this disclosure.

FIG. 3 is a block diagram of an example computing device operating as an instance of a controller for a virtu-alized computing infrastructure. Computing device 300 is an example instance of controller 5 (FIG. 1) for a virtualized computing infrastructure. Computing device 300 of FIG. 3 may represent one or more real or virtual servers configured to perform operations for at least one of a network controller 24 and an orchestrator 23. As such, computing device 300 may in some instances implement one or more master nodes for respective clusters.

Scheduler 322, API server 320, controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, controller manager 326, network controller 324, network controller manager 325, or configuration store 328. Network controller 324 may represent an example instance of network controller 24 of FIG. 1. Scheduler 322, API server 320, controller manager 326, and network con-troller manager 325 may implement an example instance of orchestrator 23. Network controller manager 325 may rep-resent an example implementation of a Kubernetes cloud controller manager or Kube-manager. Network controller 324 may represent an example instance of network control-ler 24.

Computing device 300 includes in this example, a bus 342 coupling hardware components of a computing device 300 hardware environment. Bus 342 couples network interface card (NIC) 330, storage disk 346, and one or more micro-processors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, com-ponents coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, BSD, another Unix-variant kernel, or a Windows server operating system kernel, available from Microsoft Corp. In some instances, the operating system may execute a hypervisor and one or more virtual machines managed by hypervisor. Example hypervisors include KVM for the Linux kernel, Xen, ESXi available from VMware, Windows Hyper-V available from Microsoft, and other open-source and proprietary hypervisors. The term hypervisor can encompass a VMM. An operating system that includes kernel 314 provides an execution environment for one or more processes in user space 345. Kernel 314 includes a physical driver 355 to use the network interface card 330.

Computing device 300 may be coupled to a physical network switch fabric that includes an overlay network that extends switch fabric from physical switches to software or virtual routers of physical servers coupled to the switch fabric, such virtual router 220A or 220B of FIG. 2. Computing device 300 may use one or more dedicated virtual networks to configure minion nodes of a cluster.

API server 320, scheduler 322, controller manager 326, and configuration store may implement a master node for a cluster and be alternatively referred to as "master components." The cluster may a Kubernetes cluster and the master node a Kubernetes master node, in which case the master components are Kubernetes master components.

API server 320 includes code executable by microprocessor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 322 includes code executable by microprocessor 310. Scheduler 322 may be one or more computer processes. Scheduler 322 monitors for newly created or requested virtual execution elements (e.g., pods of containers) and selects a minion node on which the virtual execution elements are to run. Scheduler 322 may select a minion node based on resource requirements, hardware constraints, software constraints, policy constraints, locality, etc. Scheduler 322 may represent a Kubernetes scheduler.

In general, API server 320 may invoke the scheduler 322 to schedule a virtual execution element, which may select a minion node and returns an identifier for the selected minion node to API server 320, which may write the identifier to the configuration store 328 in association with the virtual execution element. API server 320 may invoke the orchestration agent 209 for the selected minion node, which may cause the container engine 208 for the selected minion node to obtain the virtual execution element from a storage server and create the virtual execution element on the minion node. The orchestration agent 209 for the selected minion node may update the status for the virtual execution element to the API server 320, which persists this new state to the configuration store 328. In this way, computing device 300 instantiates new virtual execution elements in the computing infrastructure 8.

Controller manager 326 includes code executable by microprocessor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller 324 includes code executable by microprocessor 310. Network controller 324 may include one or more computer processes. Network controller 324 may represent an example instance of network controller 24 of FIG. 1. Network controller 324 may be a logically centralized but physically distributed Software Defined Networking (SDN) controller that is responsible for providing the management, control, and analytics functions of a virtualized network. In particular, network controller 324 may be a logically centralized control plane and management plane of the computing infrastructure 8 and orchestrates vRouters for one or more minion nodes.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 324 programs network infrastructure elements to create virtual networks and may create interface configurations for virtual network interfaces for the virtual networks.

Additional information regarding network controller 24 operating in conjunction with other devices of data center 10 or other software-defined network is found in International Application Number PCT/US2013/044378 and in U.S. Pat. No. 9,571,394, incorporated by reference above.

Network controller manager 325 includes code executable by microprocessor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors the cluster for new objects (e.g., pods and services). Network controller manager 325 may isolate pods in virtual networks and connect pods with services.

Network controller manager 325 may be executed as a container of the master node for a cluster. In some cases, using network controller manager 325 enables disabling the service proxies of minion nodes (e.g., the Kubernetes kube-proxy) such that all pod connectivity is implemented using virtual routers, as described herein.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers.

The following example deployment configuration for this application consists of a pod and the virtual network information for the pod:

```
apiVersion: v1
kind: Pod
metadata:
    name: multi-net-pod
    annotations:
        networks: '[
            { "name": "red-network" },
            { "name": "blue-network" },
            { "name": "default/extns-network" }
        ]'
spec:
    containers:
    - image: busybox
      command:
        - sleep
        - "3600"
      imagePullPolicy: IfNotPresent
      name: busybox
      stdin: true
      tty: true
    restartPolicy: Always
```

This metadata information is copied to each pod replica created by the controller manager 326. When the network controller manager 325 is notified of these pods, network controller manager 325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
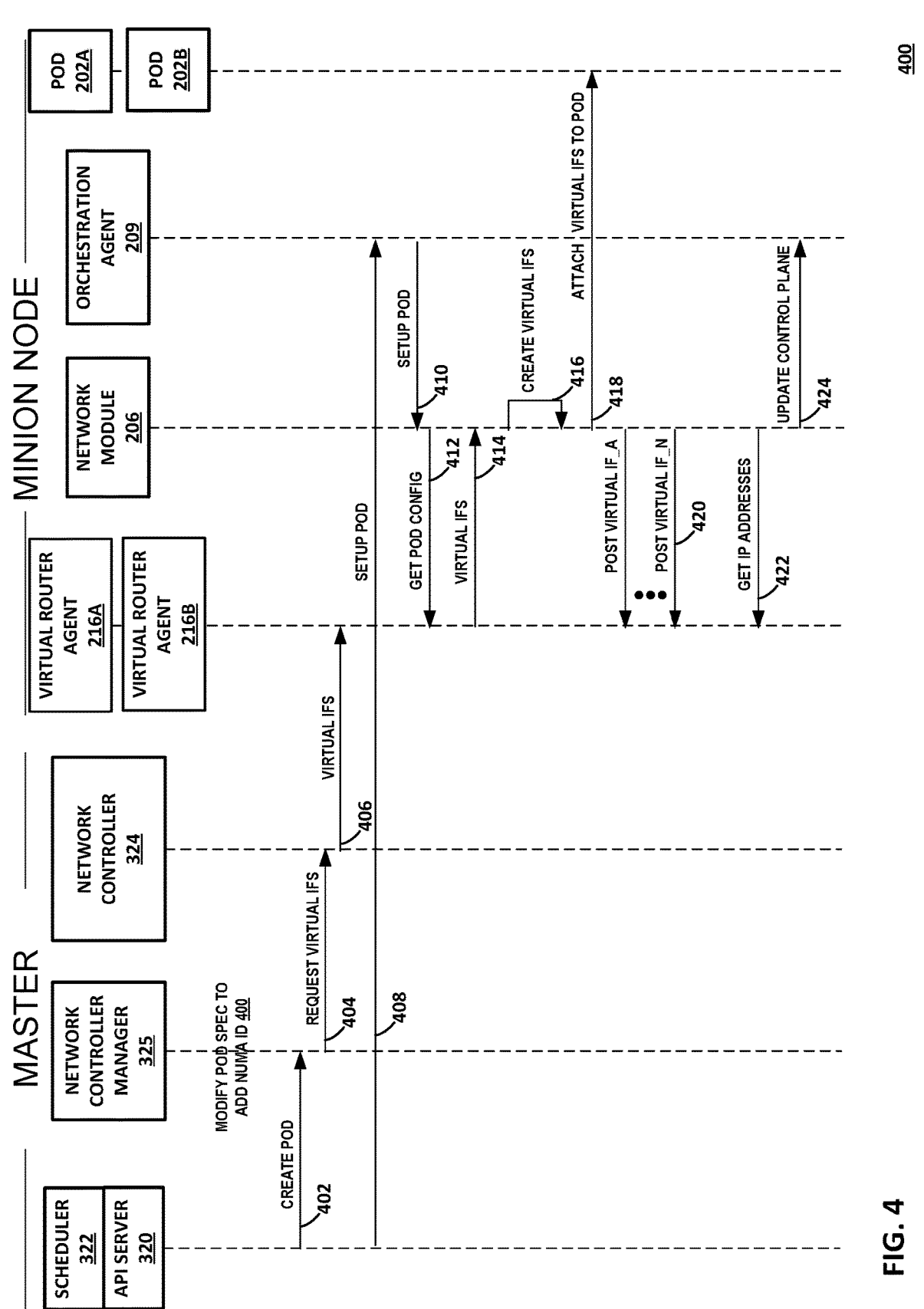
FIG. 4 is a flow diagram illustrating the example creation of network virtual interfaces for a virtual execution element using a network module, according to techniques described in this disclosure.

FIG. 4 is a flow diagram illustrating one example workflow for creation of one or more network virtual interfaces for a virtual execution element using a network module, according to some aspects described in this disclosure. For purposes of example, the operations are described with respect to components of computing devices 200 and 300 of FIGS. 2-3. API server 320 receives a request to instantiate a pod 202A or pod 202B and modifies the configuration store 328 by generating and storing configuration information for creating the pod 202A (402). Scheduler 322 may select the computing device 200 as the host minion node for the pod 202A or pod 202B. API server 320 may annotate the pod 202A or pod 202B with a list of multiple virtual networks and an identifier for the pod (e.g., a universally unique identifier (pod_uuid), or simply a unique identifier (pod_uid)). Other forms of identifiers for the pod may be used. The annotations may be labels for the pod configuration that indicate the virtual networks, such as "virtual network A" and "virtual network B".

Network controller manager 325 listens for new objects from API server 320 and determines that pod 202A or pod 202B is to be instantiated on computing device 200 and determines, from the annotations, that the pod 202A or pod 202B requires virtual network interfaces with the multiple virtual networks indicated in the annotations. The listening may be in response to subscribing to API server 320 notifications on a RESTful interface, for example. In some examples, network controller manager 325 may modify a pod specification to add a NUMA identifier 400 that is associated with NUMA NODE 250A or NUMA NODE 250B to indicate the NUMA on which the pod should be instantiated. The network controller manager 325 may in this way load balance pods among multiple different NUMA nodes, optionally in cooperation with scheduler 322, API server 320, or network controller 324. In other examples, other network elements, such as scheduler 322, API server 320, or network controller 324 may include the NUMA identifier in the pod specification or modify the pod specification to add the NUMA identifier. In some examples, the NUMA identifier 400 is indicated in the pod specification using a key value pair, such as "NUMA": "1" to indicate NUMA 1 for the pod. This may have the effect of passing the NUMA identifier to the CNI, enabling the CNI to determine, from the pod specification, the NUMA node of the pod for which the CNI is attaching one or more virtual network interfaces.

The scheduler 322 may select the NUMA node of a compute node for a pod. As such, in some examples, scheduler 322 may be a custom NUMA-aware scheduler so the pod scheduling needs to, e.g., balance among multiple NUMA nodes. In some examples, a topology manager (not shown) may be used and extended to perform NUMA selection for a pod. Other examples may leverage other components for NUMA selection. In some cases, the scheduler 322 modifies the pod spec to indicate the NUMA identifier for the NUMA node that is to execute the pod. In some cases, the network controller manager 325 determines the NUMA identifier for a NUMA node that is to execute the pod from CPU/NIC mapping updated with a network topology or using a CPU manager, rather than from a pod specification modified by scheduler 322.

Network controller manager 325 directs network controller 324 to create the virtual networks and to create virtual network interfaces for pod 202A or pod 202B for the virtual networks (404). Network controller manager 325 may annotate the pods with respective uuids for the one or more virtual network interfaces (e.g., vni_uuids) to be created by network controller 324 as well as the allocated, respective unique private virtual network addresses (and in some cases MAC addresses) or with the NUMA identifier associated with the pod. Other forms of identifiers for the virtual network interfaces may be used.

Network controller 324 may associate virtual network interfaces with the pod in interface configuration data 25 for pod 202A or pod 202B. For example, network controller 324 may create a list of virtual network interfaces for the virtual networks and may associate the vni_uuids with the pod_uuid in interface configuration data 25 for pod 202A or pod 202B. The vni-uuids may be another identifier for the virtual network interfaces, such as virtual machine interface identifiers. Network controller 324 may send the interface configuration data 25A (or 25B) to the virtual router agent 216A (or 216B) for virtual router 220A (or 220B) of computing device 200 and configure corresponding virtual network interfaces in the computing device 200 (406). Virtual router agent 216A (or 216B) may store an association of each vni_uuid with the corresponding configured virtual network interface.

To setup pod 202A or pod 202B, orchestration agent 209 obtains container specification data for pod 202A or pod 202B and ensures the containers execute by computing device 200 (408). The container specification data may include the pod_uuid for pod 202A or pod 202B. The orchestration agent 209 invokes a network module 206 to configure the virtual network interfaces for pod 202A or pod 202B (410). Network module 206 requests (412) and obtains the interface configuration data 25A or 25B from virtual router agent 216A or 216B, respectively (414). For example, network module 206 may obtain the interface configuration data 25A from virtual router agent 216A by requesting the interface configuration data for the pod corresponding to the pod_uuid included in the container specification data for pod 202A.

To create each of the virtual network interfaces 26A-26N or 27A-27N indicated in interface configuration data 25A or 25B (416), network module 206 may cause an interface to be created in pod 202A or pod 202B by passing in configuration data (418) and may make any necessary changes on the computing device 200. The configuration data in step 418 may include, e.g., IP address (IPv4/IPv6), MAC, DNS configuration, MTU, interface name, and vhost socket dir path and socket name for vhost control channel to DPDK application pod 202A or pod 202B.

Network module 206 notifies virtual router agent 216A or 216B of the now-operational (by virtue of configuration by pod 202A or pod 202B) virtual network interfaces 26 or 27 (420). Network module 206 may also obtain the virtual network addresses from virtual router agent 216A or 216B (422) or by invoking an appropriate IPAM plugin. Network module 206 may configure the virtual network addresses inside the pod 202A or pod 202B network namespace and may setup routes by invoking the virtual router agent 216A or 216B, respectively. Alternatively, network module 206 may configure the virtual network addresses inside pod 202A or pod 202B network namespace and may setup routes consistent with the IP Address Management section by invoking an appropriate IPAM plugin. Network module 206 may update the orchestration control plane by notifying orchestration agent 209 (424).

Figure 5:
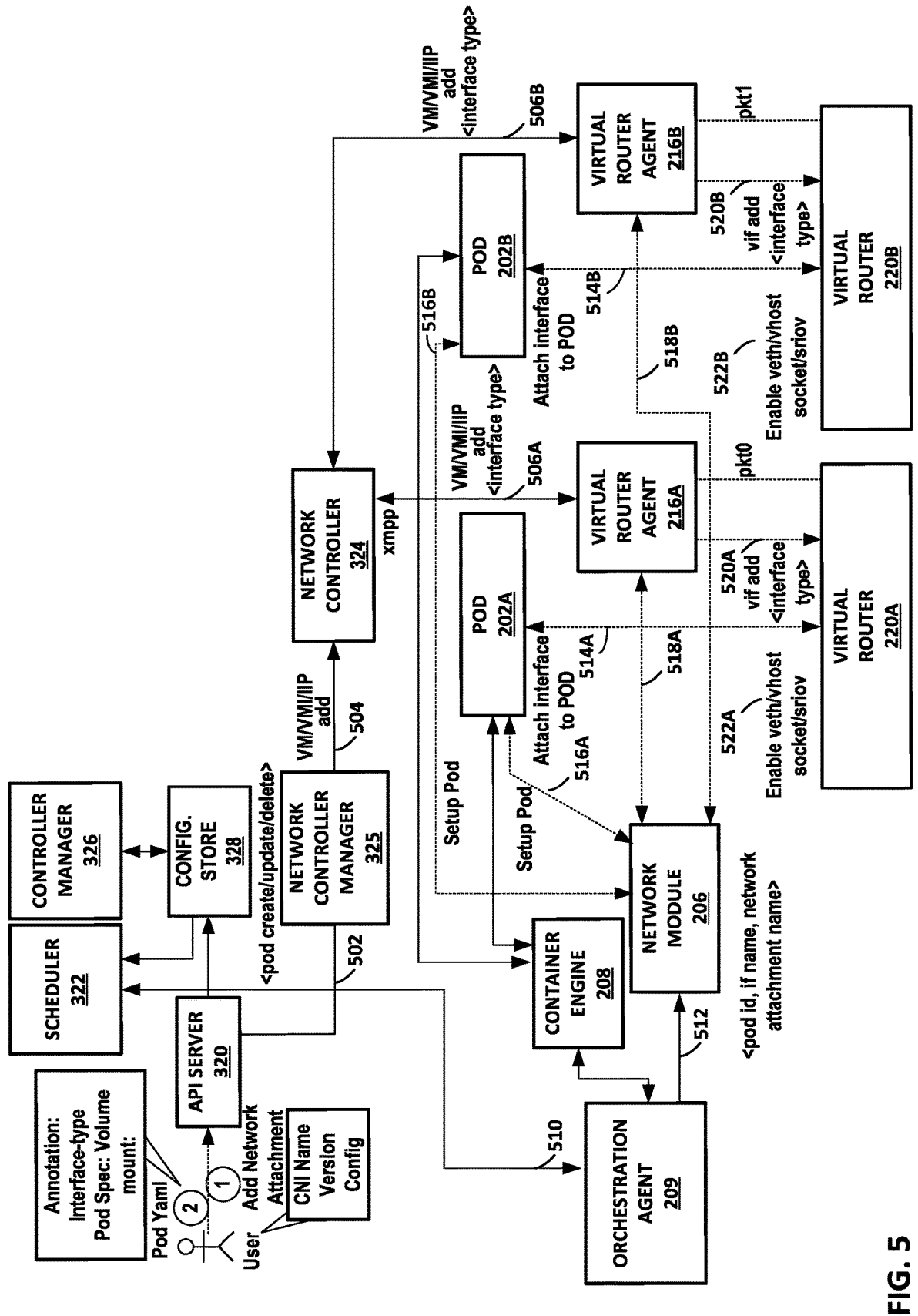
FIG. 5 is a block diagram illustrating the example creation of network virtual interfaces for a virtual execution element using a CNI that supports multiple types of interfaces, according to techniques described in this disclosure.

FIG. 5 is a block diagram illustrating the example creation of network virtual interfaces for a virtual execution element using a CNI that supports multiple types of interfaces, according to techniques described in this disclosure.

FIG. 5 illustrates an overview of how orchestration and networking components may apply techniques described herein to configure virtual networking interfaces of various types. Network controller manager 325 may watch on various Kubernetes events like pod, namespace creation or deletion, and may translate the needed information into network controller objects (502). Network controller manager 325 may pass various needed pod annotations to network module 206 via network controller 324 and virtual router agents 216A or 216B.

Network controller 324, on receiving the ADD event from network control manager 325 (504), may work with virtual router agent 216A and/or virtual router agent 216B and may receive the pod information and also various details on interfaces associated with pod 202A and/or pod 202B, including basic configuration information like IP, MAC, vlan etc. (506A and/or 506B, respectively). Other information which is specific to NIC 13A may be generated by network controller manager 325 like vhost socket name, dir, vhost mode for DPDK NICS. Network controller manager 325 may configure various interfaces like SR-IOV which may bypass virtual router 220A where pod 202A may not want to use the virtual router feature set or virtual router 220B where pod 202B may not want to use the virtual router feature set.

To setup the pod 202A, orchestration agent 209 obtains container specification data with an interface type identifier for pod 202A and ensures the containers execute by computing device 200 (510). The container specification data may include the pod_uuid for pod 202A and <interface type>. The orchestration agent 209 invokes network module 206 to configure the virtual network interfaces for the pod 202A (512). Network module 206 requests and obtains the interface configuration data from virtual router agent 216A (514A). Network module 206 may obtain the interface configuration data with the interface type identifier from virtual router agent 216A by requesting the interface configuration data for the pod corresponding to the pod_uuid, and optionally <interface type>, included in the container specification data for pod 202A.

Similarly, to setup the pod 202B, orchestration agent 209 obtains container specification data with an interface type identifier for pod 202B and ensures the containers execute by computing device 200 (510). The container specification data may include the pod_uuid for pod 202B and <interface type>. The orchestration agent 209 invokes network module 206 to configure the virtual network interfaces for the pod 202B (512). Network module 206 requests and obtains the interface configuration data from virtual router agent 216B (514B). Network module 206 may obtain the interface configuration data with the interface type identifier from virtual router agent 216B by requesting the interface configuration data for the pod corresponding to the pod_uuid, and optionally <interface type>, included in the container specification data for pod 202B.

To create each of the virtual network interfaces 212 indicated in interface configuration data, network module 206 may cause an interface to be created in pod 202A by taking steps to insert the interface into the network namespace for pod 202A and request that other components (vRouter agent 216A, SR-IOV switch, open vSwitch, etc.) add the interface to their forwarding/switching information (516A). The interface configuration data in step 514A may include, e.g., MAC, DNS configuration, MTU, interface name, and vhost socket dir path and socket name for vhost control channel to DPDK application pod 202A. Network module 206 notifies virtual router agent 216A of the now-operational (by virtue of configuration by pod 202A) virtual network interfaces 212 (518A). Virtual router agent 216A add the interface type to virtual router 220A (520). Pod 202A may be configured with a veth/vhost socket (522A). In some examples, pod 202A may be configured with a SR-IOV interface that bypasses virtual router 220A and connects to a physical switch.

Network module 206 may also cause an interface to be created in pod 202B by taking steps to insert the interface into the network namespace for pod 202B and request that other components (vRouter agent 216B, SR-IOV switch, open vSwitch, etc.) add the interface to their forwarding/switching information (516B). The interface configuration data in step 514B may include, e.g., MAC, DNS configuration, MTU, interface name, and vhost socket dir path and socket name for vhost control channel to DPDK application pod 202B. Network module 206 notifies virtual router agent 216B of the now-operational (by virtue of configuration by pod 202B) virtual network interfaces 212 (518B). Virtual router agent 216B add the interface type to virtual router 220B (520B). Pod 202B may be configured with a veth/vhost socket (522B). In some examples, pod 202B may be configured with a SR-IOV interface that bypasses virtual router 220B and connects to a physical switch (see FIG. 6).

Network module 206 may also obtain (e.g., using a GET request) the virtual network addresses (e.g., IP address (IPv4/IPv6)) from the virtual router agent 216A (422) and/from virtual router agent 216B or by invoking an appropriate IPAM plugin, and configure the containers with the virtual network addresses for use in sending and receiving virtual network traffic.

FIG. 6 is a flow diagram of an example techniques for deploying containers to virtualized computing infrastructure according to the techniques of this disclosure. While the example of FIG. 6 is discussed with respect to computing device 200 of FIG. 2, the techniques of FIG. 6 may be performed by other computing devices.

Orchestration agent 209 may instantiate, on a first NUMA node of a computing device, a first virtual router for one or more virtual networks, the first virtual router including a first virtual host interface having a first IP address, wherein the first NUMA node includes first processing circuitry and a first network interface card (600). For example, orchestration agent 209 may instantiate virtual router 220A on NUMA NODE 250A of computing device 200. Virtual router 220A may include vhost interface 240A which has a first IP address. NUMA NODE 250A may include microprocessor 210A and NIC 230A.

Network module 206 may instantiate a first workload on the first NUMA node (602). For example, network module 206 may instantiate pod 202A or a container of containers 229A on NUMA NODE 250A.

Orchestration agent 209 may instantiate, on a second NUMA node of the computing device, a second virtual router for the one or more virtual networks, the second virtual router including a second virtual host interface having a second IP address, wherein the second NUMA node includes second processing circuitry and a second network interface card (604). For example, orchestration agent 209 may instantiate virtual router 220B on NUMA NODE 250B of computing device 200. Virtual router 220B may include vhost interface 240B which has a second IP address, which may be different than the first IP address of vhost interface 240A. NUMA NODE 250B may include microprocessor 210B and NIC 230B.

Network module 206 may instantiate a second workload on the second NUMA node (606). For example, network module 206 may instantiate pod 202B or a container of containers 229B on NUMA NODE 250B.

In some examples, the second virtual router (e.g., virtual router 220B) may forward, based on routing information, packets destined for the first workload (e.g., any of containers 229A of pod 202A) of the first NUMA node (e.g., NUMA NODE 250A), via an external interface (e.g., physical interface 232B) of the second network interface card (e.g., NIC 230B) to an underlay switch (e.g., TOR switch 16 of FIG. 1). In some examples, the first virtual router (e.g., virtual router 220A) may forward, based on routing information, packets destined for the second workload (e.g., any of containers 229B of pod 202B) of the second NUMA node (e.g., NUMA NODE 250B), via an external interface (e.g., physical interface 232A) of the first network interface card (e.g., NIC 230A) to the underlay switch.

In some examples, the first IP address and the second IP address are IP addresses for an underlay network coupled to the first network interface card and the second network interface card. In some examples, the first virtual router is a data plane development kit (DPDK)-based virtual router executing as a third workload (e.g., one of containers 229A) of the first NUMA node and the first virtual host interface (vhost interface 240A) includes a virtual network interface configured for the third workload.

In some examples, the first virtual router comprises a first virtual tunnel endpoint and the second virtual router comprises a second virtual tunnel endpoint. In some examples, a virtual router agent (e.g., virtual router agent 216A) for the first virtual router may send the first IP address to a controller (e.g., controller 5 of FIG. 1).

In some examples, network module 206 may obtain, for the first workload, a NUMA identifier associated with the first NUMA node and determine that the NUMA identifier is associated with the first NUMA node. In some examples, in response to determining the NUMA identifier is associated with the first NUMA node, network module 206 may send a request to the virtual router agent (e.g., virtual router agent 216A) for the first virtual router to add a virtual network interface for the first workload. In some examples, the virtual router agent for the first virtual router, in response to the request, may add a virtual network interface for the first workload to the first virtual router. In some examples, the virtual router agent for the first virtual router may send the first IP address to a controller to indicate the first IP address is a next hop for the first workload.

In some examples, a system includes computing device 300 (FIG. 3) configured to generate a pod specification to include a NUMA node identifier for a first NUMA node (e.g., NUMA NODE 250A) of computing device 200 (both of FIG. 2) and store the pod specification. In some examples, the system includes computing device 200 having the first NUMA node and a second NUMA node (e.g., NUMA NODE 250B), wherein computing device 200 is configured to instantiate a pod for execution by the first NUMA node based on data generated from the pod specification, the data including an indication of the NUMA identifier.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A physical server comprising:
   a first non-uniform memory access (NUMA) node and a second NUMA node, wherein the first NUMA node comprises:
   a first network interface card;
   a first workload executing on the first NUMA node; and
   a first virtual router for one or more virtual networks, the first virtual router comprising first processing circuitry and configured with a first virtual host interface having a first Internet Protocol (IP) address, wherein the first virtual router executes as another workload of the first NUMA node and the first virtual host interface comprises a virtual network interface configured for the another workload; and wherein the second NUMA node comprises:

a second network interface card;

a second virtual router for the one or more virtual networks, the second virtual router comprising second processing circuitry and configured with a second virtual host interface having a second IP address, wherein the second virtual router is configured with routing information to cause the second virtual router to forward packets, destined for the first workload of the first NUMA node, via an external interface of the second network interface card to a switch external to the physical server; and a second workload executing on the second NUMA node.

2. The physical server of claim 1, wherein the switch comprises an underlay switch.

3. The physical server of claim 2, wherein the first virtual router is configured with routing information to cause the first virtual router to forward packets, destined for the second workload of the second NUMA node, via an external interface of the first network interface card to the underlay switch external to the physical server.

4. The physical server of claim 1, wherein the first IP address and the second IP address are IP addresses for an underlay network coupled to the first network interface card and the second network interface card.

5. The physical server of claim 1, wherein the first virtual router is a data plane development kit (DPDK)-based virtual router.

6. The physical server of claim 1, wherein the first virtual router comprises a first virtual tunnel endpoint, and wherein the second virtual router comprises a second virtual tunnel endpoint.

7. The physical server of claim 1, further comprising:

a virtual router agent for the first virtual router, the virtual router agent being configured to send the first IP address to a controller.

8. The physical server of claim 1, further comprising:

a network module configured to obtain, for the first workload, a NUMA identifier associated with the first NUMA node and determine that the NUMA identifier is associated with the first NUMA node.

9. The physical server of claim 8, further comprising:

a virtual router agent for the first virtual router, wherein the network module is configured to request, in response to determining the NUMA identifier is associated with the first NUMA node, the virtual router agent for the first virtual router to add the virtual network interface for the first workload, and wherein the virtual router agent for the first virtual router is configured to, in response to the request, add the virtual network interface for the first workload to the first virtual router.

10. The physical server of claim 9, wherein the virtual router agent for the first virtual router is further configured to send the first IP address to a controller to indicate the first IP address is a next hop for the first workload.

11. A method comprising:

instantiating, on a first non-uniform memory access (NUMA) node of a physical server, a first workload, wherein the first NUMA node includes first processing circuitry and a first network interface card;

instantiating, on the first NUMA node, a first virtual router for one or more virtual networks, the first virtual router including a first virtual host interface having a first Internet Protocol (IP) address, wherein the first virtual router executes as another workload of the first NUMA node and the first virtual host interface comprises a virtual network interface configured for the another workload;

instantiating, on a second NUMA node of the physical server, a second virtual router for the one or more virtual networks, the second virtual router including a second virtual host interface having a second IP address, wherein the second NUMA node includes second processing circuitry and a second network interface card;

instantiating a second workload on the second NUMA node; and forwarding, by the second virtual router and based on routing information, packets destined for the first workload of the first NUMA node, via an external interface of the second network interface card to a switch external to the physical server.

12. The method of claim 11, wherein the switch comprises an underlay switch.

13. The method of claim 12, further comprising:

forwarding, by the first virtual router and based on routing information, packets destined for the second workload of the second NUMA node, via an external interface of the first network interface card to the underlay switch external to the physical server.

14. The method of claim 11, wherein the first IP address and the second IP address are IP addresses for an underlay network coupled to the first network interface card and the second network interface card.

15. The method of claim 11, further comprising:

sending, by a virtual router agent for the first virtual router, the first IP address to a controller.

16. The method of claim 15, further comprising:

obtaining, by a network module, for the first workload, a NUMA identifier associated with the first NUMA node; and determining that the NUMA identifier is associated with the first NUMA node.

17. The method of claim 16, further comprising:

sending, in response to determining the NUMA identifier is associated with the first NUMA node, a request to the virtual router agent for the first virtual router to add the virtual network interface for the first workload; and adding, by the virtual router agent for the first virtual router, in response to the request, the virtual network interface for the first workload to the first virtual router.

18. The method of claim 17, further comprising:

sending, by the virtual router agent for the first virtual router, the first IP address to a controller to indicate the first IP address is a next hop for the first workload.

* * * * *